United States Patent
Chang et al.

(10) Patent No.: US 8,629,638 B2
(45) Date of Patent: Jan. 14, 2014

(54) LOCK PROTECTION AND STANDBY MODE CONTROL CIRCUIT OF MOTOR DRIVING APPARATUS

(75) Inventors: Chia-Jung Chang, Taoyuan County (TW); Wei-Line Chang, Taichung (TW)

(73) Assignee: Niko Semiconductor Co., Ltd., New Taipei (TW)

( * ) Notice: Subject to any disclaimer, the term of this patent is extended or adjusted under 35 U.S.C. 154(b) by 368 days.

(21) Appl. No.: 13/179,146

(22) Filed: Jul. 8, 2011

(65) Prior Publication Data

US 2013/0009573 A1  Jan. 10, 2013

(51) Int. Cl.
*H02H 99/00* (2009.01)

(52) U.S. Cl.
USPC ............... 318/400.21; 318/434; 318/558

(58) Field of Classification Search
USPC .................... 318/400.21, 434, 558
See application file for complete search history.

(56) References Cited

U.S. PATENT DOCUMENTS 5,892,340 A * 4/1999 Sasajima et al. ............... 318/293
8,274,249 B2 * 9/2012 Mishima .................. 318/400.21

* cited by examiner

*Primary Examiner* — Bentsu Ro
(74) *Attorney, Agent, or Firm* — Li & Cai Intellectual Property (USA) Office

(57) ABSTRACT

A motor driving apparatus including a lock protection unit, a standby mode control unit, and a motor control circuit is provided. The lock protection unit receives a motor speed signal representing the rotation of the motor and generates a lock signal accordingly. The standby mode control unit receives a PWM signal and the lock signal and generates a standby mode control signal accordingly. The lock protection unit decides whether to stop generating the lock signal or not accordingly to the standby mode control signal. The motor control circuit controls the rotation of the motor according to the PWM signal and changes the operation mode according to the standby mode control signal and the lock signal.

17 Claims, 8 Drawing Sheets

| conducted switch | | state description |
|---|---|---|
| M1 | M4 | Phase I |
|  | M4 | dead time |
| M3 | M4 | discharging period |
| M3 |  | dead time |
| M3 | M2 | Phase II |
| M3 |  | dead time |
| M3 | M4 | discharging period |
|  | M4 | dead time |

Fig. 6

LOCK PROTECTION AND STANDBY MODE CONTROL CIRCUIT OF MOTOR DRIVING APPARATUS

BACKGROUND OF THE INVENTION (1) Field of the Invention

This invention relates to a motor driving apparatus, and more particularly relates to a motor driving apparatus which controls rotation speed of motor according to the pulse width modulation (PWM) signal.

(2) Description of the Prior Art

The technology of using PWM signals to control the rotation of motor is broadly applied to DC motor driving circuit. This technology adopts the PWM signal with a frequency much higher than the rotation speed of DC motor. With the duty cycle of the PWM signal being varied, the charging period for the coil on the rotor can be adjusted so as to control the rotation speed of the motor.

There are two important issues for the design of DC motor driving circuit. Firstly, as the motor is idle for a significant time period, the driving circuit should be able to enter the standby mode for reducing power consumption. Meanwhile, the driving circuit should be able to response the suddenly start-up signal in time. Secondly, the driving circuit should be able to recognize whether the rotor of the motor is locked or not so as to prevent over-charging from damaging the driving circuit.

As to the former, a typical method is to calculate the lasting time the PWM signal stays at low level to judge whether the standby mode should be activated. That is, after the PWM signal has stayed at low level over a predetermined time period, the DC motor driving circuit will enter the standby mode immediately for reducing power consumption.

As to the latter, a typical method is to apply a special control for the motor driving circuit when the rotor is locked. For example, as the motor stops rotation over a predetermined time has been detected, a pulse signal with a predetermined time interval is used to drive the motor instead of the original PWM signal. The pulse signal is capable to have the motor back to normal when the obstacle of the motor is removed.

The rotational condition of motor is determined by the hall signal of the motor. Thus, the lock protection function can be activated according to the hall signal. On the other hand, the control of standby mode is determined according to the lasting time the PWM signal stays at low level. However, the condition that the motor is locked and standby mode are confusing because in both cases the motor is stopped. Thus, how to cooperate the operations of lock protection and standby mode control is an important issue for the skill.

SUMMARY OF THE INVENTION

Accordingly, a main object of the present invention is to provide a motor driving apparatus with the operations of lock protection and standby mode control being properly cooperated such that the motor driving apparatus may enter or leave the standby mode in time.

To achieve the above mentioned object, a motor driving apparatus is provided in accordance with a preferred embodiment of the present invention. The motor driving apparatus has a lock protection unit, a standby mode control unit, and a motor control circuit. The lock protection unit generates a lock signal according to a motor speed signal from a motor. The standby mode control unit receives a PWM signal for driving the motor and the lock signal, and generates a standby mode control signal according to the PWM signal and the lock signal. The lock protection unit decides whether to stop the lock signal or not according to the standby mode control signal. The motor control circuit controls the rotation of the motor according to the PWM signal.

A lock protection and standby mode control circuit of a motor driving apparatus is also provided in accordance with a preferred embodiment of the present invention. The lock protection and standby mode control circuit has a lock protection unit and a standby mode control unit. The lock protection unit generates a lock signal according to a motor speed signal from a motor. The standby mode control unit receives a PWM signal and the lock signal, and generates a standby mode control signal according to the PWM signal and the lock signal. The lock protection unit decides whether to stop the lock signal or not according to the standby mode control signal.

BRIEF DESCRIPTION OF THE DRAWINGS

The present invention will now be specified with reference to its preferred embodiment illustrated in the drawings, in which:

FIG. 6 is a table showing the phase changing process, which is carried out by using the motor control circuit to detect the node voltages of the motor coil in accordance with a preferred embodiment of the present invention.

DESCRIPTION OF THE PREFERRED EMBODIMENT

Figure 1:
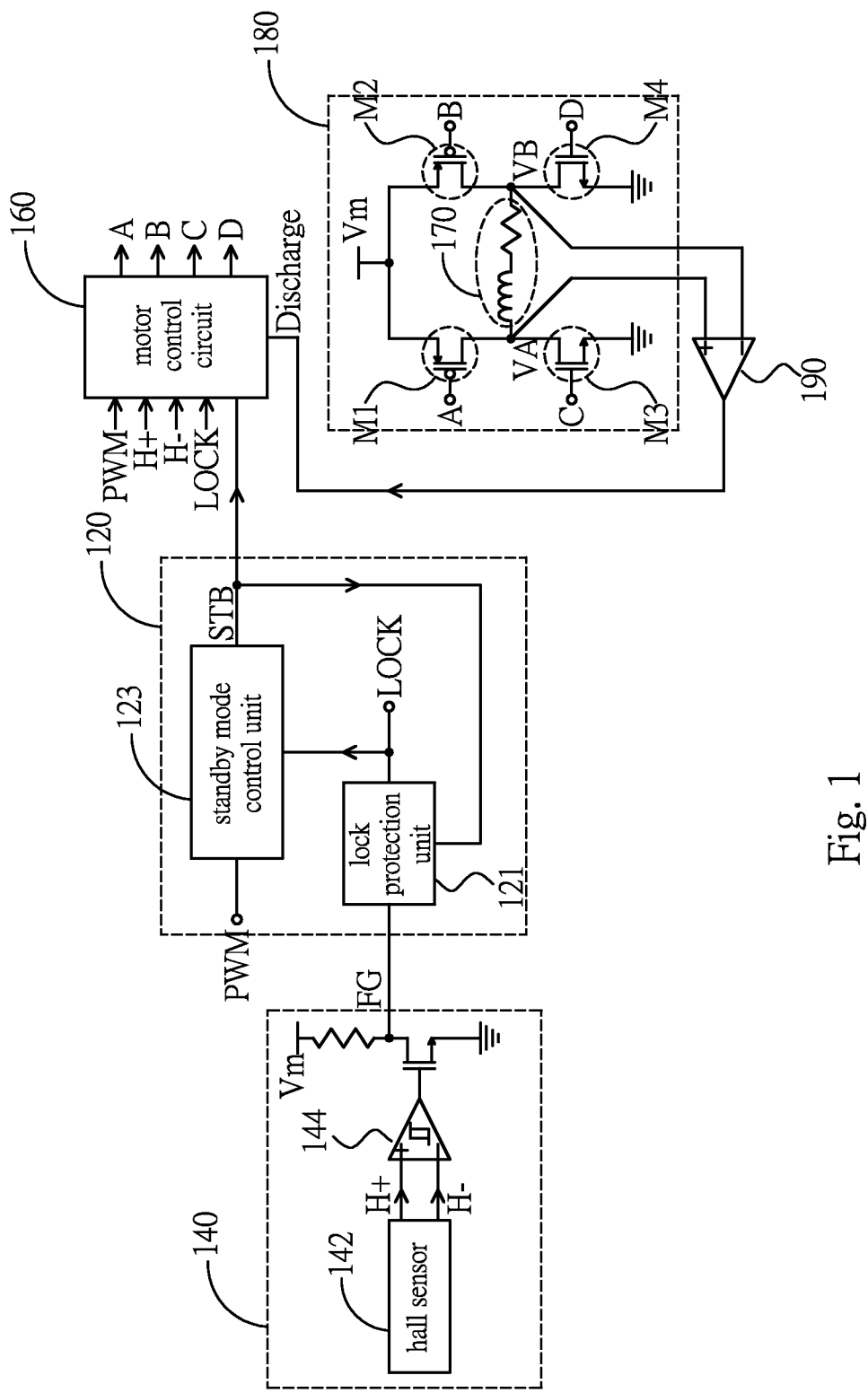
FIG. 1 is a schematic view of a motor driving apparatus in accordance with a preferred embodiment of the present invention.

FIG. 1 is a schematic view showing a DC motor driving apparatus in accordance with a preferred embodiment of the present invention. As shown, the DC motor driving apparatus has a lock protection and standby mode control circuit 120, a motor speed detecting circuit 140, and a motor control circuit 160.

The motor speed detecting circuit 140 detects the rotation of the motor so as to generate a motor speed signal FG. In the present embodiment, the motor speed detecting circuit 140 has a hall sensor 142 for detecting the rotation of the motor. The hall sensor 142 generates a pair of hall signals H+ and H− with frequencies correlated to the rotational speed of the motor. The hall signals H+ and H− are then transferred to the motor speed signal FG, which is a square wave with a frequency related to the rotational speed of the motor, by using a hysteresis comparator 144. Thereby, the lock protection and standby mode control circuit 120 may determine whether there is any obstacle hindering the rotation of the motor according to the motor speed signal FG.

The lock protection and standby control circuit 120 has a lock protection unit 121 and a standby mode control unit 123. The lock protection unit 121 receives the motor speed signal FG from the motor speed detecting circuit 140 and generates a lock signal LOCK accordingly. The lock protection unit 121 uses a counter (not shown in this figure) for calculating the time the motor stops rotating. The lock protection unit 121 generates the lock signal LOCK for activating lock protection function when the motor has stopped rotating over a first predetermined time period is detected so as to prevent misjudgement. The lock protection function may be carried out by various ways, for example, a pulse signal with constant time interval may be used to restrict the inputted PWM signal so as to prevent the circuit from being burned due to continuous charging current and the power consumption can be reduced also. In addition, the pulse signal is capable to have the motor recover its normal operation as the obstacle has been removed.

The standby mode control unit 123 receives a pulse width modulation (PWM) signal PWM and the lock signal LOCK from the lock protection unit 121, and generates a standby mode control signal STB to notice the motor control circuit 160 according to the pulse width modulation signal PWM and the lock signal LOCK. In addition, the lock protection unit 121 decides whether to stop the lock signal LOCK or not according to the state of the standby mode control signal STB. For example, as the standby mode control signal STB indicates the standby mode, the lock protection unit 121 stops the lock signal LOCK as well as the calculation of any predetermined time period. The lock protection unit 121 may restart the calculation of the first predetermined time period until the standby mode control signal STB represents that the drive system is back to normal.

Figure 1A:
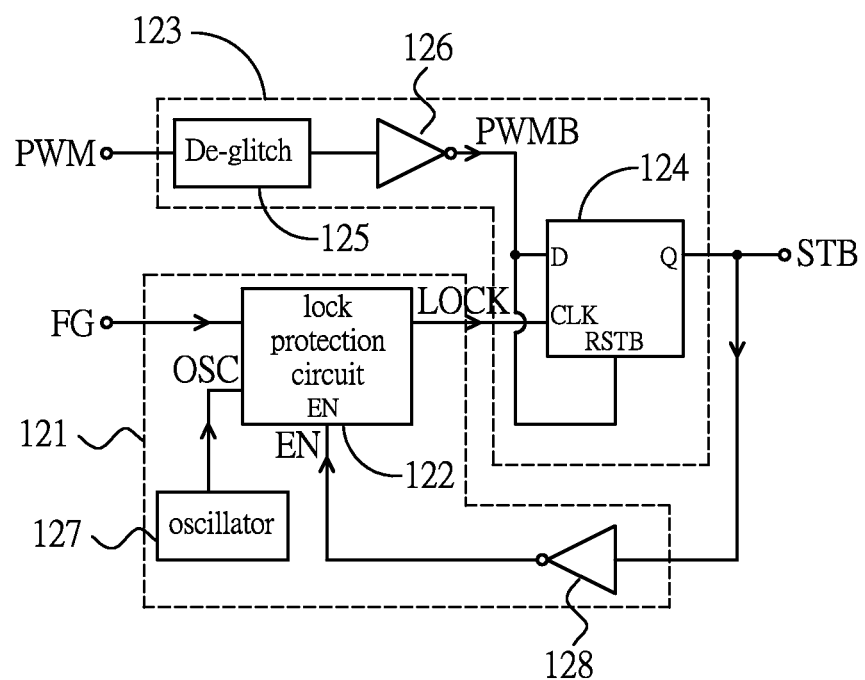
FIG. 1A is a schematic view of a lock protection and standby mode control circuit in accordance with a preferred embodiment of the present invention.

FIG. 1A is a circuit diagram showing the lock protection and standby control circuit 120 in accordance with a preferred embodiment of the present invention. As shown, the lock protection unit 121 has a lock protection circuit 122, an oscillator 127, and an inverter 128. The oscillator 127 is utilized for generating an oscillating signal. The lock protection circuit 122 has a counter for calculating the first predetermined time period according to the oscillating signal. The lock protection circuit 122 receives the motor speed signal FG from the motor speed detecting circuit 140 and estimates the time the motor stops rotating according to the motor speed signal FG. After the motor has stopped rotating over the first predetermined time period, the lock protection circuit 122 generates the lock signal LOCK.

The standby mode control unit 123 has a De-glitch circuit 125, an inverter 126, and a logic circuit 124. The De-glitch circuit 125 is utilized for reducing the unwanted influence from the noise. The inverter 126 is utilized for transferring the pulse width modulation signal PWM from the De-glitch circuit 125 into the inverted pulse width modulation signal PWMB. The logic circuit 124, which may includes a flip-flop circuit, receives the inverted pulse width modulation signal PWMB and the lock signal LOCK from the lock protection unit 121 and generates the standby mode control signal STB accordingly.

In the present embodiment, the high level standby mode control signal STB represents the standby mode, and the inverted standby mode control signal STB is inputted to the lock protection circuit 122 as an enable signal. That is, as the enable signal from the inverter 128 is high, which represents that the drive system is in the normal operation mode, the lock protection circuit 122 would remain enabled. In contrast, as the enable signal from the inverter 128 is low, which represents the standby mode, the lock protection circuit 122 would be disabled and the generation of the lock signal LOCK would be stopped. The lock protection circuit 122 would be enabled until the standby mode control signal STB returns to low. Meanwhile, the calculation of the first predetermined time period would be restarted at this very moment.

Figure 1B:
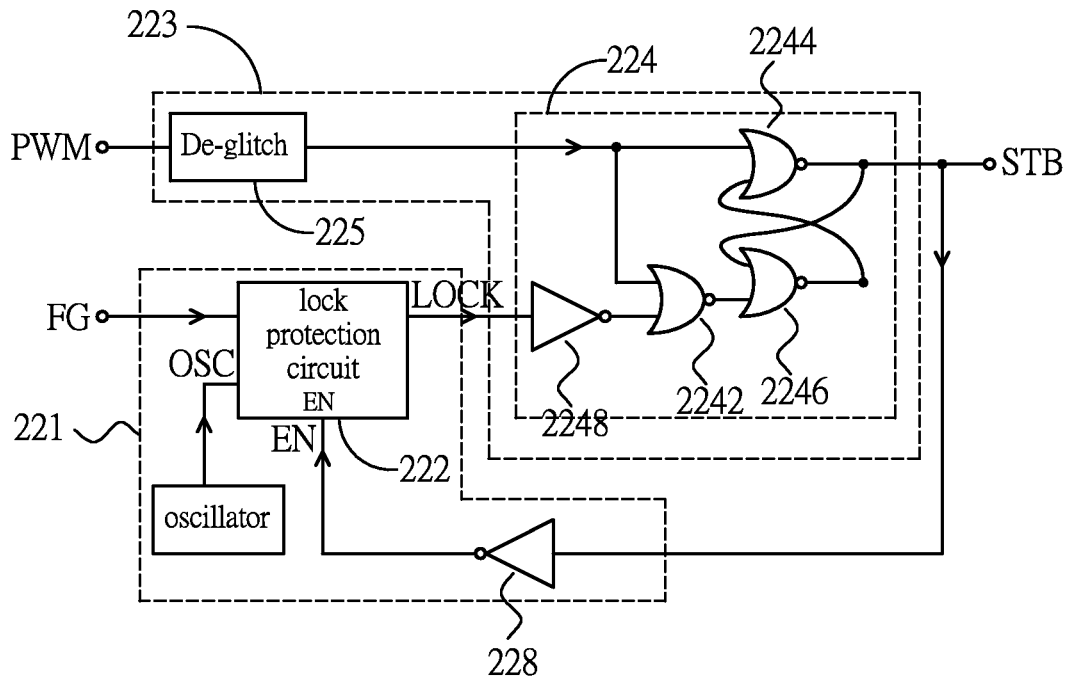
FIG. 1B is a schematic view of the logic circuit of the lock protection and standby mode control circuit in accordance with a first embodiment of the present invention.
Figure 1C:
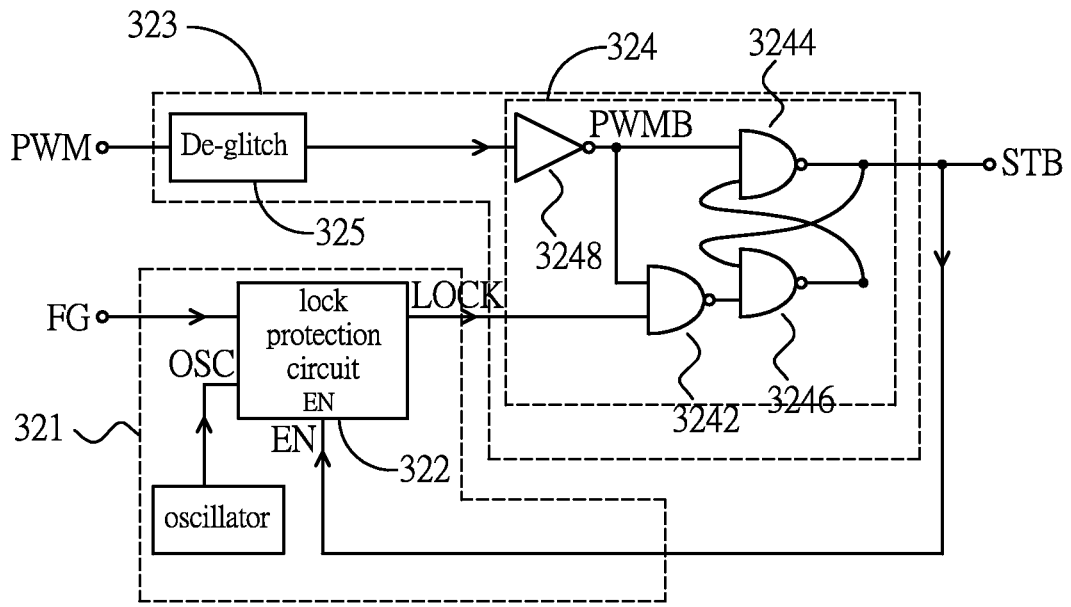
FIG. 1C is a schematic view of the logic circuit of the lock protection and standby mode control circuit in accordance with a second embodiment of the present invention.

FIGS. 1B and 1C are schematic views showing two different embodiments of the logic circuit of the present invention. In the first embodiment as shown in FIG. 1B, the standby mode control unit 223 has a logic circuit 224 and a De-glitch circuit 225. The logic circuit 224 has three NOR gates 2242, 2244, 2246 and an inverter 2248. The inverter 2248 receives the lock signal LOCK from the lock protection unit 221 and generates an output signal to the NOR gate 2242. The NOR gate 2242 receives the output signal from the inverter 2248 and the pulse width modulation signal PWM from the De-glitch circuit 225 and generates high level output signal when both the pulse width modulation signal PWM and the inverted signal of the lock signal LOCK are low.

The two NOR gates 2244 and 2246 compose a SR latch circuit. The reset node of the SR latch circuit receives the pulse width modulation signal PWM from the De-glitch circuit 225. The set node of the SR latch circuit receives the output signal of the NOR gate 2242. As the pulse width modulation signal PWM is low and the output signal of the NOR gate 2242 is high to show that the lock signal LOCK is high, the SR latch circuit outputs high level standby mode control signal STB at the output node thereof to announce the drive system entering the standby mode.

The operation of the lock protection unit 221 is decided by the standby mode control signal STB. That is, the lock protection circuit 222 in the lock protection unit 221 receives the standby mode control signal STB through the inverter 228 as an enable signal. The lock protection circuit 222 decides whether the high level lock signal LOCK and the calculation of lock protection time period should be stopped according to the standby mode control signal STB.

Referring to FIG. 1C, in the second embodiment, the standby mode control unit 323 has a logic circuit 324 and a De-glitch circuit 325. The logic circuit 324 has three NAND gates 3242, 3244, 3246, and an inverter 3248. The inverter 3248 receives the pulse width modulation signal PWM from the De-glitch circuit 325 and generates the inverted pulse width modulation signal PWMB. The NAND gate 3242 receives the lock signal LOCK from the lock protection unit 321 and the inverted pulse width modulation signal PWMB from the inverter 3248 and generates a low level output signal when both the inverted pulse width modulation signal PWMB and the lock signal LOCK are high.

The NAND gates 3244 and 3246 compose a SR latch circuit. The reset node of the SR latch circuit receives the inverted pulse width modulation signal PWMB. The set node of the SR latch circuit receives the output signal from the NAND gate 3242. When the pulse width modulation signal PWM is low and the output signal of the NAND gate 3242 is low to represent the high level lock signal LOCK, the SR latch circuit outputs a low level standby mode control signal STB at the output node thereof to announce the drive system entering the standby mode.

In contrast with the embodiments of FIGS. 1A and 1B, the standby mode control signal STB is low to indicate the standby mode in the present embodiment. In addition, the lock protection circuit 322 in the lock protection unit 321 of the present embodiment receives the standby mode control signal STB as the enable signal without the usage of an inverter. The lock protection unit 321 decides whether the high level lock signal LOCK and the calculation of the lock protection time period should be stopped according to the standby mode control signal STB.

Figure 2:
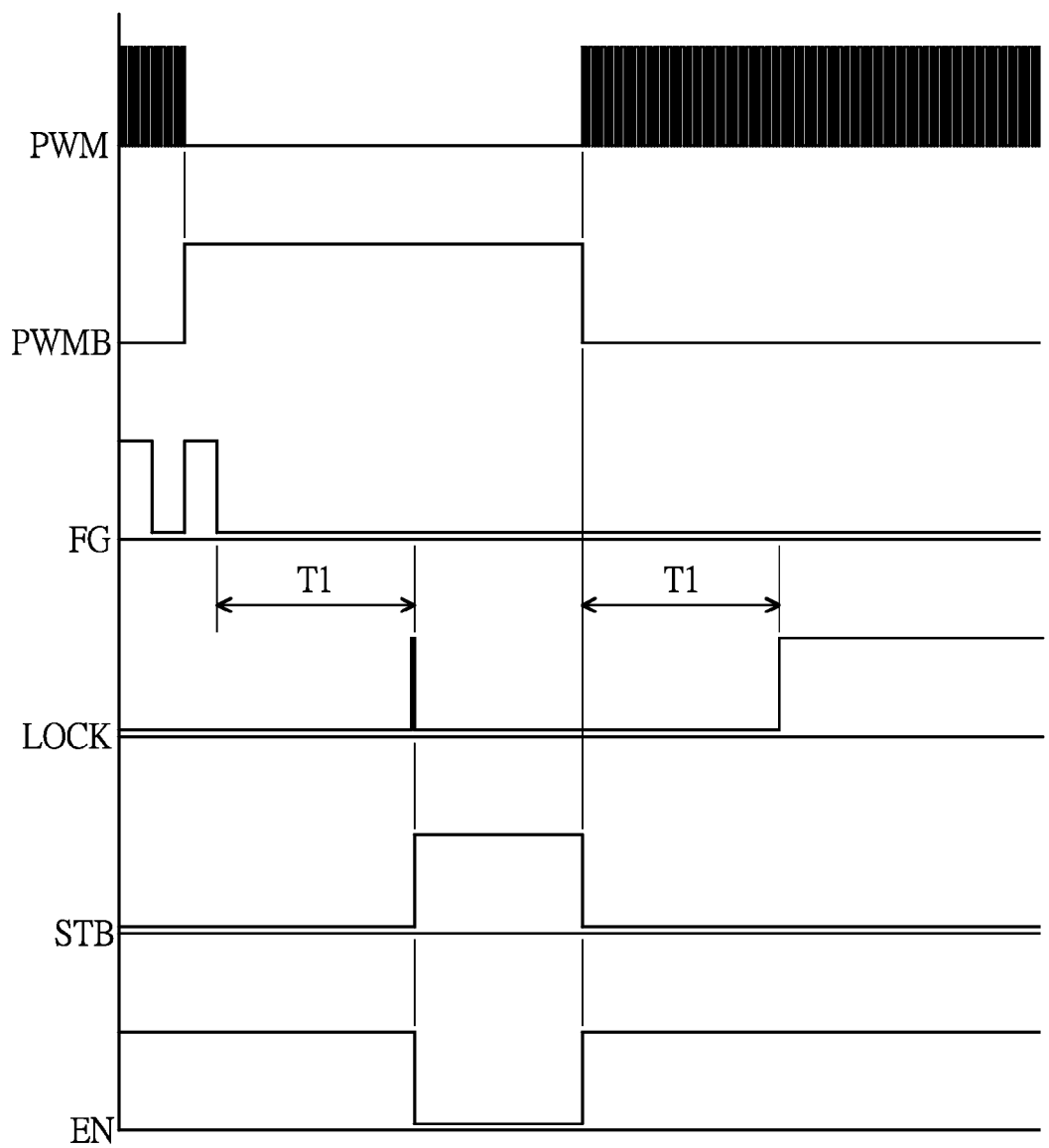
FIG. 2 is a timing diagram showing the operation of the lock protection and the standby mode control circuit of FIG. 1A in accordance with a preferred embodiment of the present invention.

FIG. 2 is a timing diagram shows the waveforms of the signals related to the operation of the lock protection and standby control circuit 120 in FIG. 1A. As shown, when the drive system is in an idle state, the pulse width modulation signal PWM for driving the motor is low, the inverted pulse width modulation signal PWMB is high, and the rotation of the motor would be eventually stopped.

When detecting the high level inverted pulse width modulation signal PWMB, the logic circuit 124 does not output the high level standby mode control signal STB immediately. As shown, the lock protection unit 121 outputs the high level lock signal LOCK as the motor speed signal FG indicates that the motor has stopped rotating for a predetermined time period T1, and the logic circuit 124 outputs the high level standby mode control signal STB to have the motor control circuit 160 entering the standby mode until receiving the high level lock signal LOCK from the lock protection unit 121.

As mentioned, the standby mode control signal STB from the logic circuit 124 is utilized not only for controlling the motor control circuit 160 to enter the standby mode but also for controlling the operation of the lock protection unit 121. That is, as the standby mode control signal STB is high to represent the standby mode, the enable signal EN from the inverter 128 is low to have the lock protection circuit 122 stops generating the lock signal LOCK and clears the counting data. Thus, since the logic circuit 124 continues outputting the high level standby mode control signal STB during the standby mode, the lock protection unit 121 keeps clearing the counting data and the high level lock signal LOCK would not be generated.

When the pulse width modulation signal PWM is transferred to high level to have the motor back to the normal state, the logic circuit 124 stops outputting the high level standby mode control signal STB according to the low level inverted pulse width modulation signal PWMB so as to have the motor control circuit 160 back to normal. Meanwhile, the enable signal EN would be shifted to high level to enable the lock protection circuit 122.

As shown, when the pulse width modulation signal PWM is high but the motor speed signal FG indicates that the motor stops rotating, the motor must be hindered. At this time, as the lock protection unit 121 detects that the motor has stopped rotating for a first predetermined time period T1, the high level lock signal LOCK is generated to change the way to drive the motor. In addition, attending with the continuous high level pulse width modulation signal PWM, the high level standby mode control signal STB would not be generated but the low level one is outputted instead to show that the drive system is under normal operation. Meanwhile, the motor control circuit 160 changes the way to drive the motor when receiving the high level lock signal LOCK. For example, a pulse signal with constant intervals can be used to restrict the inputted pulse width modulation signal PWM so as to prevent the circuit from being burned due to over-charging and also reduce power consumption.

Figure 3:
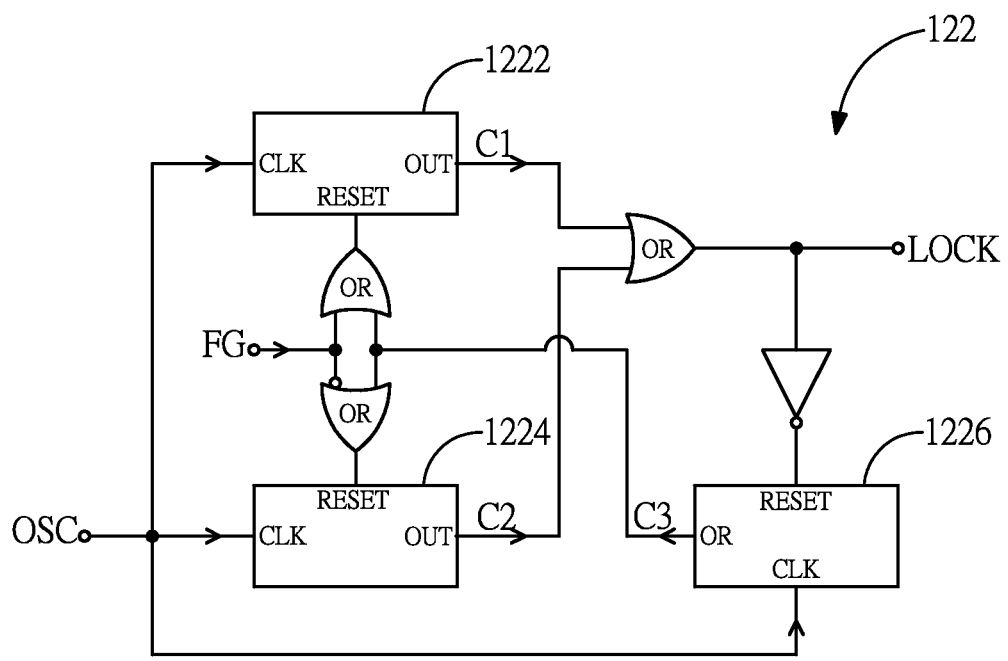
FIG. 3 is a schematic view showing the lock protection unit of FIG. 1A in accordance with a preferred embodiment of the present invention.

FIG. 3 is a schematic view showing the lock protection circuit 122 in accordance with a preferred embodiment of the present invention. As shown, the lock protection circuit 122 has a first counter 1222, a second counter 1224, and a third counter 1226. The first counter 1222 is configured to be reset when the motor speed signal FG is high. The second counter 1224 is configured to be reset when the motor speed signal FG is low. The first counter 1222 outputs a high level signal C1 when the counting completes, and the second counter 1224 outputs a high level signal C2 when the counting completes. Therefore, no matter the motor speed signal FG stops at high level or low level, at least a counter 1222 or 1224 is capable to generate a high level output signal C1, C2 after finishing counting so as to induce the high level lock signal LOCK.

When the lock signal LOCK is shifted to high, the third counter 1226 begins counting. The third counter 1226 may generate a high level signal C3 after the counting, and the high level signal C3 would be utilized to reset the first counter 1222 and the second counter 1224 so as to force the lock signal LOCK shifted to low. In addition, when the lock signal LOCK is shifted to low, the third counter 1226 would be reset to have the output signal C3 shifted to low.

Figure 4:
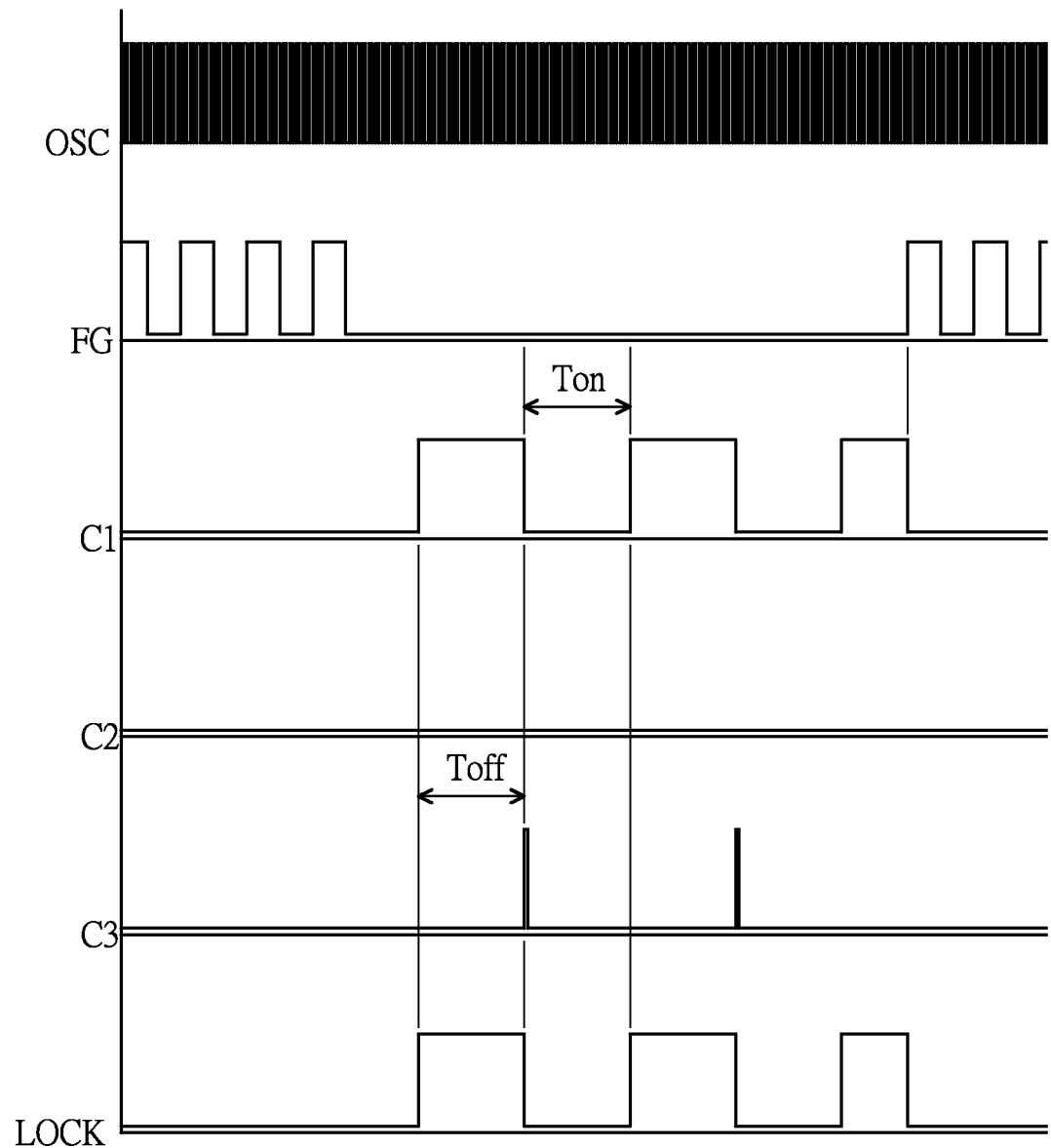
FIG. 4 is a timing diagram showing the operation of the lock protection unit of FIG. 3 in accordance with a preferred embodiment of the present invention.

FIG. 4 is a timing diagram showing the operation of the lock protection circuit 122 in accordance with a preferred embodiment of the present invention. As mentioned, the first counter 1222 would be reset when the motor speed signal FG is low and the second counter 1224 would be reset when the motor signal FG is high. The counting of the first counter 1222 and the second counter 1224 would be restarted after being reset and the first counter 1222 and the second counter 1224 may generate high level signals until the counting completes. In the present embodiment, the first counter 1222 and the second counter 1224 have identical counting time period Ton. As shown, when the motor speed signal FG is stopped at low level, the first counter 1222 may finish counting first and the high level signal C1 would be generated so as to induce the high level lock signal LOCK to announce the motor control circuit 160 stop charging the coil 170.

Assume the counting time period of the third counter 1226 is Toff. As the lock signal LOCK is shifted to high, the third counter 1226 begins counting. When the counting completes, the third counter 1226 generates the high level signal C3 to reset the first counter 1222 and the second counter 1224. Thus, after receiving the high level signal C3, the first counter 1222 and the second counter 1224 stop generating the high level signals C1,C2 and the counting of the counting time period To is restarted. At this time, because both the output signals C1 and C2 are low, the lock signal LOCK would be shifted to low to reset the third counter 1226 and has the output signal C3 shifted to low.

During the counting time period Ton, the high level output signals C1 and C2 would not be generated and the lock signal LOCK would be kept at low. After the first counter 1222 and the second counter 1224 finish counting, the high level output signal C1 (assuming the motor speed signal FG is stopped at low) would be generated if the motor is still locked and the high level lock signal LOCK would be generated to enable the counting of the counting time period Toff. In contrast, when the lock event of the motor is removed, the first counter 1222 and the second counter 1224 would be refreshed alternatively such that no high level output signals C1 and C2 would be generated. Thus, the motor control circuit 160 controls the rotation of the motor according to the pulse width modulation signal PWM.

Accordingly, in case the motor is locked, the lock protection circuit 122 outputs the lock signal LOCK with a constant interval to change the operation of the motor control circuit 160. That is, as the lock signal LOCK is high, the motor control circuit 160 stops charging the coil 170, and as the lock signal LOCK is low, the motor control circuit 160 remains its ordinary operation based on the pulse width modulation signal PWM. The alternative charging and non-charging operations of the motor control circuit 160 is able to prevent the coil 170 from being burned due to overcharging.

As shown in FIG. 1, the motor control circuit 160 controls the rotation of the motor by using a single phase motor driving circuit 180. The single phase motor driving circuit 180 has four switches M1, M2, M3, and M4, which compose an H-bridge for driving the motor. The operation of the H-bridge can be divided into two distinct conduction phases. In the first conduction phase (phase I), the switches M1 and M4 are turned on. In the second conduction phase (phase II), the switches M2 and M3 are turned on.

Right after the motor driving circuit 180 is changed from the first conduction phase (phase I) to the second conduction phase (phase II), the induction current continues flowing toward the right side of this figure and the value is substantially kept at the threshold value. Thus, a significant reverse current flowing back to the power end Vm would be generated. To prevent the reverse current from damaging the circuit, a reverse current prohibit circuit 190 is provided in the motor driving apparatus of the present invention. The reverse current prohibit circuit 190 detects the voltage level Va,Vb at the both ends of the motor coil 170 such that the conduction of the switches M1, M2, M3, and M4 would be controlled according to the difference of the two voltage levels Va and Vb.

Figure 5:
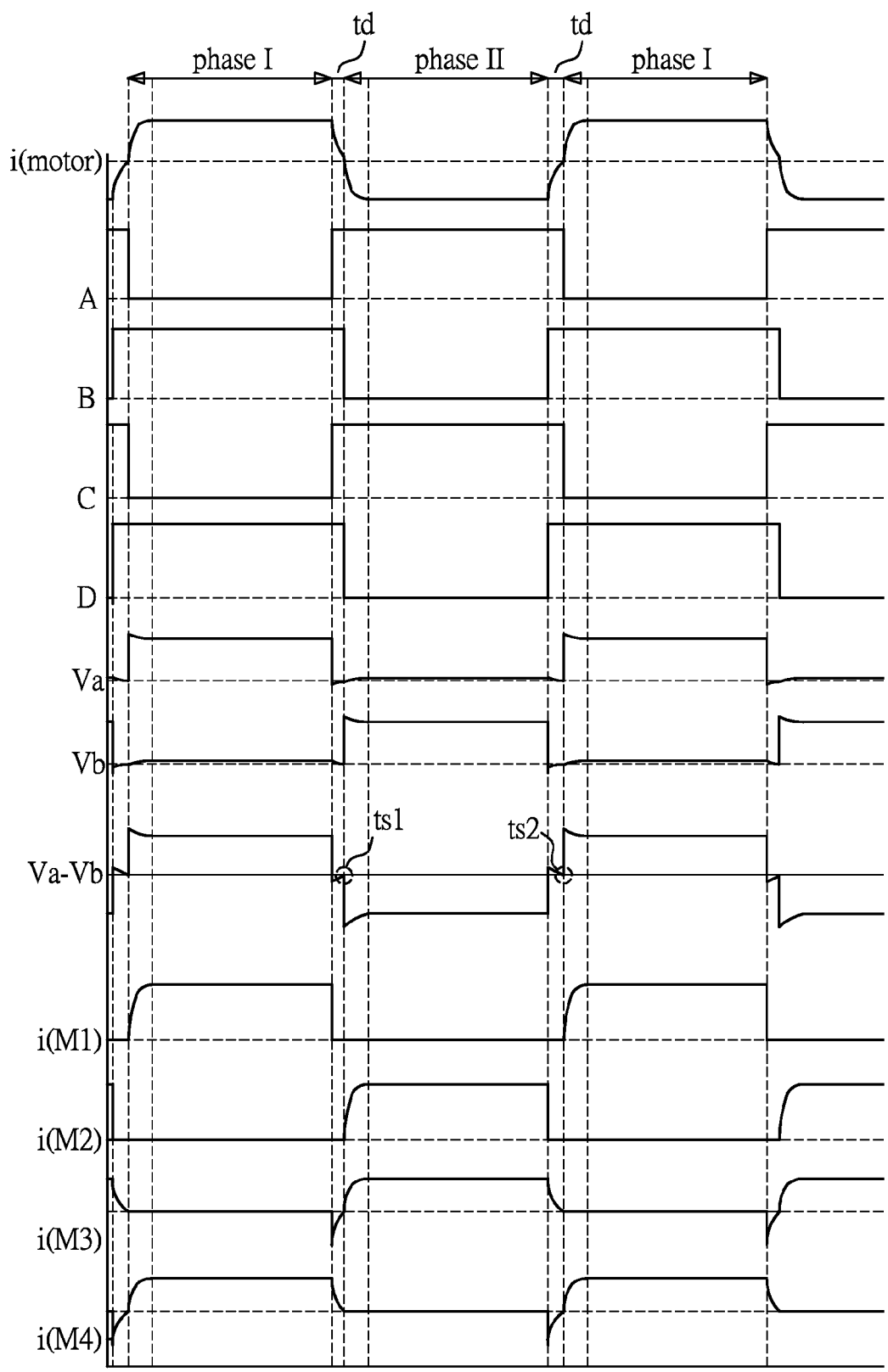
FIG. 5 is a timing diagram showing the operations of the reverse current prohibit circuit and the motor driving circuit of FIG. 1 in accordance with a preferred embodiment of the present invention.

FIG. 5 is a timing diagram showing the waveforms of the signals relative to the operation of the reverse current prohibit circuit 190 and the motor driving circuit 180. The voltage signals A, B, C, and D are the gate control signals of the switches M1, M2, M3, and M4, respectively. The current signal i(motor) is the coil current of the motor. The current signals i(M1), i(M2), i(M3), and i(M4) are the current flows through the switches M1, M2, M3, and M4, respectively. The voltage levels Va is the voltage level at the node VA between switches M1 and M3, the voltage level Vb is the voltage level at the node VB between the switches M2 and M4. That is, the voltage levels Va and Vb can be regarded as the voltage levels at the opposite ends of the motor coil 170.

FIG. 6 shows the phase change process of the motor driving circuit 180 by using the reverse current prohibit circuit 190 to control the switches M1, M2, M3, and M4. Also referring to FIG. 5, in the first conduction phase (phase I), the gate control signal A is low and the gate control signal D is high to turn on the switches M1 and M4 respectively. At this time, the current i(motor) flows from the left side through the coil 170 to the right side of this figure, which is defined as a positive current value.

At the end of the first conduction phase (phase I), the gate control signal A is shifted to high to turn off the switch M1 and the gate control signal C is shifted to high to turn on the switch M3 such that the discharging period begins. At this time, the power end Vm stops charging the coil 170 but the induction current on the coil i(motor) keeps flowing toward the switch M4 to have the left node VA of the coil 170 shows a negative voltage level Va and the right node VB shows a positive voltage level Vb. Therefore, the difference of the voltage levels between the two ends of the coil 170 (Va-Vb) is negative and would be increased toward zero attending with the discharging of the coil 170.

As the absolute value of the difference between the voltage levels Va and Vb is smaller than a first predetermined reference voltage level, the reverse current prohibit circuit 190 generates a discharging control signal Discharge. After receiving the discharging control signal Discharge, the motor control circuit 160 turns the gate control signal B to low to turn on the switch M2 and turns the gate control signal D to low to turn off the switch M4 such that the second conduction phase (phase II) begins.

At the end of the second conduction phase (phase II), the gate control signal B is shifted to high to turn off the switch M2 and the gate control signal D is shifted to high to turn on the switch M4 and the discharging period begins. At this time, the power end Vm stops charging the coil 170, but the induction current i(motor) remains flowing toward the switch M3 to have the left node VA of the coil 170 shows a positive voltage level Va and the right node VB of the coil 170 shows a negative voltage level Vb. Therefore, the difference between the voltage levels between the two ends of the coil 170 (Va-Vb) is positive and would be reduced toward zero attending with the discharging of the coil 170.

As the absolute value of the difference between the voltage levels Va and Vb is smaller than a second predetermined reference voltage, the reverse current prohibit circuit 190 generates a discharging control signal Discharge. After receiving the discharging control signal Discharge, the motor control circuit 160 turns the gate control signal A to low to turn on the switch M1 and turns the gate control signal C to low to turn off the switch M3 such that the first conduction phase (phase I) begins.

In the transition of the first conduction phase (phase I) and the discharging period of the above mentioned embodiment, the switches M1 and M3 are simultaneously switched. However, in order to prevent short circuit due to simultaneous conduction of the switches M1 and M3, as a preferred embodiment shown in FIG. 6, a dead time may be interposed between the first conduction phase (phase I) and the discharging period. That is, prior to the conduction of the switch M3, the switch M1 is turned off. Similarly, in order to prevent short circuit due to simultaneous conduction of the switches M2 and M4, a dead time may be interposed between the discharging period and the second conduction phase (phase II). That is, prior to the conduction of the switch M2, the switch M4 is turned off.

In addition, as a preferred embodiment, the reverse current prohibit circuit 190 in accordance with the present invention may be a comparator with two predetermined reference voltage levels. The comparator detects the voltage levels Va and Vb at the two ends VA and VB of the coil 170 and generates the discharging control signal Discharge to announce the motor control circuit 160 proceeding phase change movements when the absolute value of the difference between the voltage levels Va and Vb is smaller than the first predetermined reference voltage level (when the voltage level difference (Va-Vb) is negative) or the second predetermined reference voltage level (when the voltage level difference (Va-Vb) is positive). However, the present invention is not so restricted. The comparator may have only one predetermined reference voltage level and generate the discharging control signal Discharge when the absolute value of the difference between the voltage levels Va and Vb is smaller than the predetermined reference voltage level.

While the preferred embodiments of the present invention have been set forth for the purpose of disclosure, modifications of the disclosed embodiments of the present invention as well as other embodiments thereof may occur to those skilled in the art. Accordingly, the appended claims are intended to cover all embodiments which do not depart from the spirit and scope of the present invention.

What is claimed is:

1. A motor driving apparatus, comprising:
   a lock protection unit, generating a lock signal according to a motor speed signal from a motor;
   a standby mode control unit, receiving a PWM signal and the lock signal, generating a standby mode control signal according to the PWM signal and the lock signal, and the lock protection unit deciding whether to stop the lock signal or not according to the standby mode control signal; and
   a motor control circuit, driving the motor according to the PWM signal.

2. The motor driving apparatus of claim 1, wherein the lock protection unit generates the lock signal when the motor stops rotating over a first predetermined time period is detected.

3. The motor driving apparatus of claim 2, wherein the lock protection unit has a lock protection circuit and an oscillator, the lock protection circuit has at least a counter for calculating the first predetermined time period according to an oscillating signal from the oscillator.

4. The motor driving apparatus of claim 1, wherein the motor control circuit enters a standby mode according to the standby mode control signal.

5. The motor driving apparatus of claim 1, wherein the lock protection unit stops generating the lock signal when sensing the standby mode control signal respective to a standby mode.

6. The motor driving apparatus of claim 5, wherein the standby mode control unit generates the standby mode control signal respective to the standby mode when receiving the lock signal and the PWM signal respective to an idle state.

7. The motor driving apparatus of claim 6, wherein the lock protection unit outputs a pulse signal as the lock signal when the PWM signal is respective to the idle state.

8. The motor driving apparatus of claim 6, wherein the standby mode control unit generates the standby mode control signal respective to a normal mode to enable the lock protection unit when the received PWM signal is respective to a normal state.

9. The motor driving apparatus of claim 1, wherein the standby mode control unit has a logic circuit which generates the standby mode control signal according to the PWM signal, and the logic circuit includes a latch circuit or a flip-flop circuit.

10. A lock protection and standby mode control circuit of a motor driving apparatus for driving a motor according a PWM signal, the lock protection and standby mode control circuit comprising:
    a lock protection unit, generating a lock signal according to a motor rotation signal from a motor; and
    a standby mode control unit, receiving the PWM signal and the lock signal, generating a standby mode control signal according to the PWM signal and the lock signal, and the lock protection unit deciding whether to stop the lock signal or not according to the standby mode control signal.

11. The lock protection and standby mode control circuit of claim 10, wherein the lock protection unit generates the lock signal when the motor stops rotating over a first predetermined time period is detected.

12. The lock protection and standby mode control circuit of claim 11, wherein the lock protection unit has a lock protection circuit and an oscillator, the lock protection circuit has a counter for calculating the first predetermined time period according to an oscillating signal from the oscillator.

13. The lock protection and standby mode control circuit of claim 10, wherein the lock protection unit stops generating the lock signal when sensing the standby mode control signal respective to a standby mode.

14. The lock protection and standby mode control circuit of claim 13, wherein the standby mode control unit generates the standby mode control signal respective to the standby mode when receiving the lock signal and the PWM signal respective to an idle state.

15. The lock protection and standby mode control circuit of claim 14, wherein the lock protection unit outputs a pulse signal as the lock signal when the PWM signal is respective to the idle state.

16. The lock protection and standby mode control circuit of claim 14, wherein the standby mode control unit generates the standby mode control signal respective to a normal mode to enable the lock protection unit when the received PWM signal is respective to a normal state.

17. The lock protection and standby mode control circuit of claim 10, wherein the standby mode control unit has a logic circuit which generates the standby mode control signal according to the PWM signal, and the logic circuit includes a latch circuit or a flip-flop circuit.

* * * * *